(12) United States Patent
Bryne

(10) Patent No.: US 10,188,171 B2
(45) Date of Patent: Jan. 29, 2019

(54) ALIGNMENT SYSTEM FOR A CLEAT AND BASE ASSEMBLY

(71) Applicant: Speedplay, Inc., San Diego, CA (US)

(72) Inventor: Richard M. Bryne, San Diego, CA (US)

(73) Assignee: Speedplay, Inc., San Diego, CA (US)

(*) Notice: Subject to any disclaimer, the term of this patent is extended or adjusted under 35 U.S.C. 154(b) by 393 days.

(21) Appl. No.: 14/161,616

(22) Filed: Jan. 22, 2014

(65) Prior Publication Data

US 2015/0201699 A1     Jul. 23, 2015

(51) Int. Cl.
| | |
|---|---|
| A43B 5/00 | (2006.01) |
| A43B 5/14 | (2006.01) |
| A43C 13/04 | (2006.01) |
| B62M 3/08 | (2006.01) |

(52) U.S. Cl.
CPC .............. *A43B 5/14* (2013.01); *A43C 13/04* (2013.01); *B62M 3/086* (2013.01)

(58) Field of Classification Search
CPC ......... A43B 5/14; A43B 13/04; A63C 13/003; A63C 13/006; A63C 13/008; B62M 3/083; B62M 3/086; A41B 1/0063
USPC .......................................... 36/131, 124, 134
See application file for complete search history.

(56) References Cited

U.S. PATENT DOCUMENTS

| | | |
|---|---|---|
| 1,370,730 A | 3/1921 | Carver |
| 3,808,910 A | 5/1974 | Desbois |
| 3,859,867 A | 1/1975 | Haines et al. |
| 4,055,005 A | 10/1977 | Meinhart |
| 4,298,210 A | 11/1981 | Lotteau |
| 4,488,453 A | 12/1984 | Drugeon et al. |
| 4,599,914 A | 7/1986 | Dunn et al. |
| 4,599,915 A | 7/1986 | Hlavac et al. |

(Continued)

FOREIGN PATENT DOCUMENTS

| | | |
|---|---|---|
| CN | 1158313 A | 9/1997 |
| CN | 1317427 A | 10/2001 |

(Continued)

OTHER PUBLICATIONS

International Search Report for International Application No. PCT/US2010/056057, dated Oct. 19, 2011.

(Continued)

*Primary Examiner* — Timothy K Trieu

(74) *Attorney, Agent, or Firm* — Sheppard, Mullin, Richter & Hampton LLP

(57) ABSTRACT

A cleat and base assembly for permitting blind alignment and engagement to one another. The cleat is disposed on an underside of a shoe sole and includes a forward cleat engagement edge and a rearward cleat engagement edge displaced at a distance along a longitudinal axis of the shoe sole. The base assembly can be provided on a bicycle pedal and includes a forward base engagement edge and a rearward base engagement edge configured to releasably retain or couple the forward and rearward cleat engagement edges, respectively. A pair of guides are disposed at angles relative to the longitudinal axis of the shoe sole, the pair of guides converging at opposing sides of one of the forward or rearward clear engagement edges to permit blind alignment and engagement of the cleat to the base assembly.

20 Claims, 14 Drawing Sheets

(56) References Cited

U.S. PATENT DOCUMENTS

| | | |
|---|---|---|
| 4,735,107 A | 4/1988 | Winkie |
| 4,739,564 A | 4/1988 | Eser |
| 4,803,894 A | 2/1989 | Howell |
| 4,815,333 A | 3/1989 | Sampson |
| 4,819,504 A | 4/1989 | Sampson |
| 4,827,633 A | 5/1989 | Feldstein |
| 4,827,797 A | 5/1989 | Le Faou et al. |
| 4,840,086 A | 6/1989 | Bidal |
| 4,898,063 A | 2/1990 | Sampson |
| 4,899,618 A | 2/1990 | Christol |
| 4,936,164 A | 6/1990 | Forke |
| 4,942,778 A | 7/1990 | Bryne |
| 5,007,185 A | 4/1991 | Lazarski |
| 5,031,342 A | 7/1991 | Crook |
| 5,079,968 A | 1/1992 | Starner |
| 5,199,324 A | 4/1993 | Sain |
| 5,213,009 A | 5/1993 | Bryne |
| 5,284,066 A | 2/1994 | Weiss |
| 5,321,995 A | 6/1994 | Zedan |
| 5,325,738 A | 7/1994 | Bryne |
| 5,363,573 A | 11/1994 | Kilgore et al. |
| 5,371,903 A | 12/1994 | Lew |
| 5,406,647 A | 4/1995 | Lew |
| 5,546,829 A | 8/1996 | Bryne |
| 5,553,516 A | 9/1996 | Weiss |
| 5,557,985 A | 9/1996 | Nagano |
| 5,575,184 A | 11/1996 | De Schrijver |
| 5,606,894 A | 3/1997 | Bryne |
| 5,657,558 A | 8/1997 | Pohu |
| 5,685,093 A * | 11/1997 | Lin .................... A43B 1/0054 36/131 |
| 5,687,619 A | 11/1997 | Bryne |
| 5,697,262 A | 12/1997 | Chen |
| 5,727,429 A | 3/1998 | Ueda |
| 5,765,450 A | 6/1998 | Kruger et al. |
| 5,778,739 A | 7/1998 | Takahama |
| 5,784,931 A | 7/1998 | Ueda |
| 5,806,379 A | 9/1998 | Nagano |
| 5,852,955 A | 12/1998 | Crisick et al. |
| 5,860,330 A | 1/1999 | Code et al. |
| 5,862,716 A | 1/1999 | Bryne |
| 5,916,332 A | 6/1999 | Chen |
| D413,711 S | 9/1999 | Hicks, Jr. |
| 6,003,408 A | 12/1999 | Hervig |
| 6,014,914 A | 1/2000 | Ueda |
| 6,070,493 A | 6/2000 | Chen |
| 6,128,973 A | 10/2000 | Nagano |
| 6,151,989 A | 11/2000 | Ueda |
| 6,205,885 B1 | 3/2001 | Hermansen et al. |
| 6,244,136 B1 | 6/2001 | Chen |
| 6,309,010 B1 | 10/2001 | Whitten |
| 6,381,878 B1 * | 5/2002 | Kennedy, III ......... A43C 15/16 36/127 |
| 6,425,304 B1 * | 7/2002 | Bryne .................... B62M 3/086 36/131 |
| 6,446,529 B1 | 9/2002 | Tanaka |
| 6,453,771 B1 | 9/2002 | Takahama et al. |
| 6,490,948 B2 | 12/2002 | Tanaka |
| 6,494,117 B1 | 12/2002 | Bryne |
| 6,536,304 B2 * | 3/2003 | Peyre .................... B62M 3/086 36/131 |
| 6,581,493 B1 | 6/2003 | Gillane |
| D481,974 S | 11/2003 | Evans |
| 7,013,754 B2 | 3/2006 | Milanowski |
| 7,017,445 B2 | 3/2006 | Bryne |
| 7,174,807 B2 | 2/2007 | Bryne |
| 7,322,259 B2 | 1/2008 | De Bast et al. |
| 7,383,646 B2 | 6/2008 | Hall |
| 7,472,498 B2 | 1/2009 | Bryne |
| D595,620 S | 7/2009 | Kingsbury |
| 7,779,560 B2 | 8/2010 | Kay |
| 7,856,905 B2 | 12/2010 | Hsieh |
| 7,877,904 B2 | 2/2011 | Bryne |
| 8,272,150 B2 | 9/2012 | Bryne |
| 8,387,287 B2 | 3/2013 | Kay et al. |
| D683,665 S | 6/2013 | Smith |
| 9,499,231 B2 * | 11/2016 | Bryne .................... B62M 3/086 |
| 2001/0008093 A1 | 7/2001 | Heim |
| 2002/0144569 A1 | 10/2002 | Tanaka |
| 2003/0051576 A1 | 3/2003 | Muraoka |
| 2004/0187635 A1 | 9/2004 | Bryne |
| 2004/0237705 A1 | 12/2004 | Conarro et al. |
| 2005/0155452 A1 | 7/2005 | Frey |
| 2005/0252337 A1 | 11/2005 | Chen |
| 2005/0284253 A1 | 12/2005 | Hervig |
| 2006/0070489 A1 | 4/2006 | Chen |
| 2006/0236809 A1 | 10/2006 | Bryne |
| 2007/0062070 A1 * | 3/2007 | Kuhtz .................. A43B 1/0072 36/127 |
| 2007/0084086 A1 | 4/2007 | Bryne |
| 2007/0193402 A1 | 8/2007 | Hsieh |
| 2010/0107451 A1 | 5/2010 | Kay et al. |
| 2010/0301632 A1 | 12/2010 | Bryne |
| 2011/0283568 A1 | 11/2011 | Woodford |
| 2012/0103131 A1 | 5/2012 | Bryne |
| 2012/0233891 A1 | 9/2012 | Woodford |
| 2013/0263477 A1 * | 10/2013 | Girard .................... A43C 15/02 36/134 |

FOREIGN PATENT DOCUMENTS

| | | |
|---|---|---|
| CN | 102379479 A | 3/2012 |
| DE | 2816189 A1 | 8/1979 |
| DE | 3315282 A1 | 10/1984 |
| DE | 3426103 A1 | 1/1986 |
| DE | 3149345 C2 | 1/1989 |
| DE | 202005019542 U1 | 2/2006 |
| DE | 102011119694 A1 | 5/2012 |
| EP | 0012097 A2 | 6/1980 |
| EP | 0015803 A2 | 9/1980 |
| EP | 0106162 A1 | 4/1984 |
| EP | 0153210 A1 | 8/1985 |
| EP | 0155114 A2 | 9/1985 |
| EP | 0293340 A2 | 11/1988 |
| EP | 0359134 A2 | 3/1990 |
| EP | 0485956 A1 | 5/1992 |
| EP | 0516013 A2 | 12/1992 |
| EP | 0619219 A1 | 10/1994 |
| EP | 0826587 A1 | 3/1998 |
| EP | 0894446 A1 | 2/1999 |
| EP | 1293424 A2 | 3/2003 |
| FR | 2279607 A1 | 2/1976 |
| FR | 2518041 A1 | 6/1983 |
| FR | 2609270 A1 | 7/1988 |
| FR | 2711963 A1 | 5/1995 |
| FR | 2775424 A1 | 9/1999 |
| FR | 2899869 A1 | 10/2007 |
| FR | 2932450 A1 | 12/2009 |
| GB | 2285609 A | 7/1995 |
| JP | 64-23202 | 7/1989 |
| JP | 05111402 | 5/1993 |
| JP | H11-103902 | 4/1999 |
| JP | 2005-46629 | 2/2005 |
| TW | 368973 | 9/1999 |
| TW | 392662 | 6/2000 |
| TW | 200303278 | 9/2003 |
| TW | M293881 | 7/2006 |
| TW | I308543 | 4/2009 |
| WO | WO2004089741 | 10/2004 |

OTHER PUBLICATIONS

International Preliminary Report on Patentability for International Application No. PCT/US2010/056057, dated May 7, 2013.

European Search Report for Application No. 13190753.7-1753, dated Dec. 12, 2013.

* cited by examiner

ALIGNMENT SYSTEM FOR A CLEAT AND BASE ASSEMBLY

FIELD OF THE INVENTION

This invention relates generally to an alignment system for a cleat and base assembly and, more particularly, to an alignment system for facilitating blind engagement between a cleat and pedal assembly.

BACKGROUND

Footwear-mounted engagement methods have been used in cycling, skiing, snowboarding, rowing, and numerous other sports, to attach a user to a device for increased power and/or control.

Engagement of footwear-mounted cleats to bicycle pedals, in particular, have been notoriously difficult for a number of reasons. The cleat is mounted to the underside of a rider's shoe sole and is thus hidden from view. Likewise, the pedal assembly, being mounted to the underside of the rider's shoe sole, is also obscured from view by the shoe during the engagement process. Thus, engagement of a rider's shoe to a pedal assembly requires the rider to blindly align or engage the cleat to the pedal, relying primarily on tactile feedback and most typically while the rider is still in motion.

To exacerbate the difficulty with engagement, bicycle pedals are rarely in a fixed position and spin freely on the cranks which also spin freely on the bicycle. The common tendency to look down at the pedals to facilitate engagement is both awkward and potentially dangerous, as it distracts the rider from paying attention to the road or trail and may cause the rider to wobble into traffic or hit a fixed object.

Other factors in recent years have contributed to the difficulty in engaging footwear mounted cleats to pedals. For example, many pedals and cleats have gotten smaller over the years and this has made the target area for aligning the cleat to the pedal significantly more difficult.

What is therefore needed is an improved cleat and pedal assembly that permits blind engagement between the pedal and cleat that does not require precise alignment of the two components to facilitate engagement.

BRIEF SUMMARY

Various embodiments of a cleat and pedal assembly are described herein which provide for reliable and ready engagement and release of the cleat and pedal assemblies. Clipless pedals, and particularly clipless pedals made for off-road use, are often designed with relatively small cleat parts that are mounted within a small recessed cavity, typically built into the shoe's sole. Because the cleats are relatively small and disposed on the underside of a user's shoe, the alignment and engagement of the cleat to the pedal is performed blindly, relying only on tactile feedback when the cleat contacts the pedal.

In one embodiment, an alignment system for facilitating engagement of a cleat to a base assembly is provided. The alignment system comprises forward and rearward cleat edges and a pair of guides extending outwardly at angles from opposing sides of one of the forward cleat edge or the rearward cleat edge. The forward and rearward cleat edges are configured to be disposed on an underside of a shoe sole and separated at a distance along a longitudinal axis of the shoe sole.

In accordance with a first aspect, the pair of guides both extend from the forward cleat edge.

In accordance with a second aspect, the forward cleat edge has a substantially straight edge joining the guides and wherein the pair of guides each extends outwardly at an angle of between 95 and 180 degrees from the forward cleat edge.

In accordance with a third aspect, the pair of guides and the forward cleat edge define a frusto-conical landing region therebetween.

In accordance with a fourth aspect, the pair of guides have lengths extending from the opposing sides of one of the forward or rearward cleat edges to opposing sides of the shoe sole.

In accordance with a fifth aspect, the pair of guides is coupled to or integral with the cleat.

In accordance with a sixth aspect, the pair of guides is coupled to or integral with the underside of the shoe sole.

In another embodiment, a cleat and base assembly is provided. The cleat and base assembly comprises a cleat, a base and a pair of guides. The cleat comprises a forward cleat edge and a rearward cleat edge separated at a distance along a longitudinal axis of the shoe sole when the cleat is mounted to an underside of the shoe sole. The base assembly comprises a forward base edge and a rearward base edge, the forward and rearward base edges being configured to releasably couple the forward and rearward cleat edges, respectively. The pair of guides extends laterally from one of the forward cleat edge or the rearward cleat edge.

In accordance with a first aspect, the forward and rearward cleat edges each comprises a pair of inserts at opposing lateral sides, the inserts being configured to contact opposing lateral sides of the forward and rearward base edges.

In accordance with a second aspect, the inserts are made of a material having a measure of hardness that is greater than hardened steel.

In accordance with a third aspect, the material is a carbide selected from the group consisting of silicon carbide, boron carbide, tungsten carbide, and titanium carbide.

In accordance with a fourth aspect, the forward and rearward base edges are shaped as tongues curved toward one another and defining retaining spaces for housing corresponding forward and rearward cleat edges underneath the tongues.

In accordance with a fifth aspect, the forward and rearward base edges are provided on the base assembly as mirror images of one another.

In a further embodiment, a cleated shoe assembly configured to releasably engage a base edge of a base assembly is provided. The cleated shoe assembly comprises a cleat, guides extending laterally from opposing sides of the cleat edge, and a landing region defined between the cleat edge and the guides. The cleat comprises a cleat edge and configured to be mounted to an underside of a shoe sole. The guides extend laterally from opposing sides of the cleat edge, the guides having a bottom surface and a top surface. The bottom surface is in direct facing relation to the underside of the shoe sole. The guides direct a base edge to the cleat edge when the base edge maintains sliding contact with the landing region and the shoe moves in a direction forward of the base edge.

In accordance with a first aspect, the bottom surface of the guides is spaced apart from the shoe sole at a distance of 2 mm or less.

In accordance with a second aspect, the bottom surface of the guides is in contact with the shoe sole.

In accordance with a third aspect, the guides have lengths extending from the opposing sides of the cleat edge to the opposing sides of the shoe sole.

In accordance with a fourth aspect, the landing region is an area of the shoe sole defined forward of the cleat edge and between the guides and the landing region has a frusto-conical shape.

In accordance with a fifth aspect, the entire landing region is a substantially smooth surface of the underside of the shoe sole to permit sliding contact with the base edge.

Other objects, features and advantages of the described preferred embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the inventions can be more readily understood by referring to the accompanying drawings in which.

Like numerals refer to like parts throughout the several views of the drawings.

DETAILED DESCRIPTION OF THE PREFERRED EMBODIMENTS

Specific, non-limiting embodiments of the present invention will now be described with reference to the drawings.

It should be understood that such embodiments are by way of example only and merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

Figure 9:
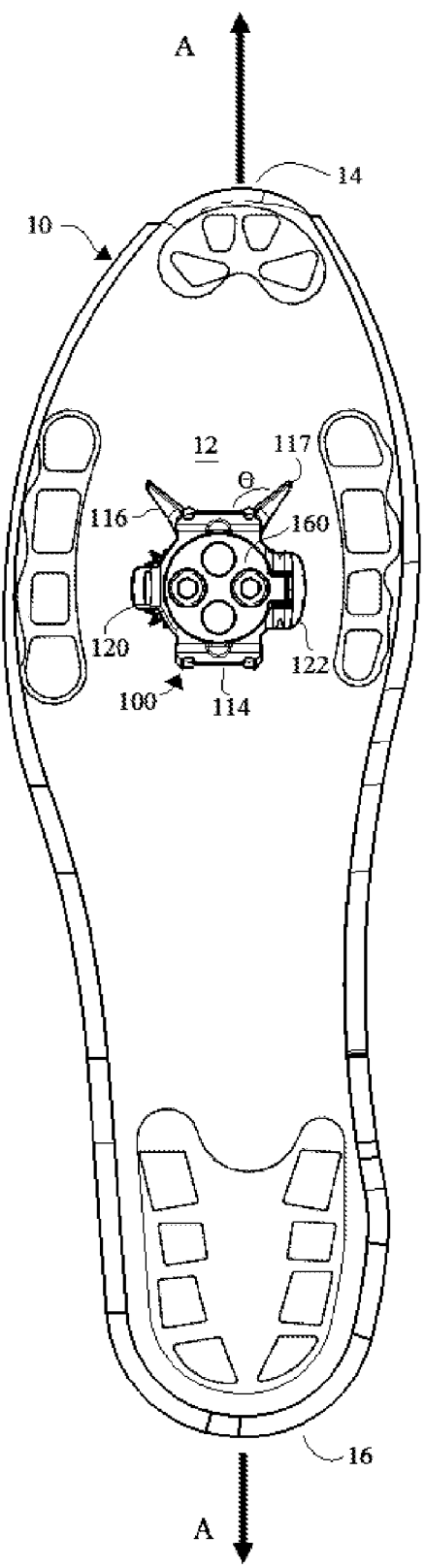
FIG. 9 depicts an embodiment of the cleat assembly of FIGS. 1A and 1B mounted to the underside of a shoe sole.
Figure 10:
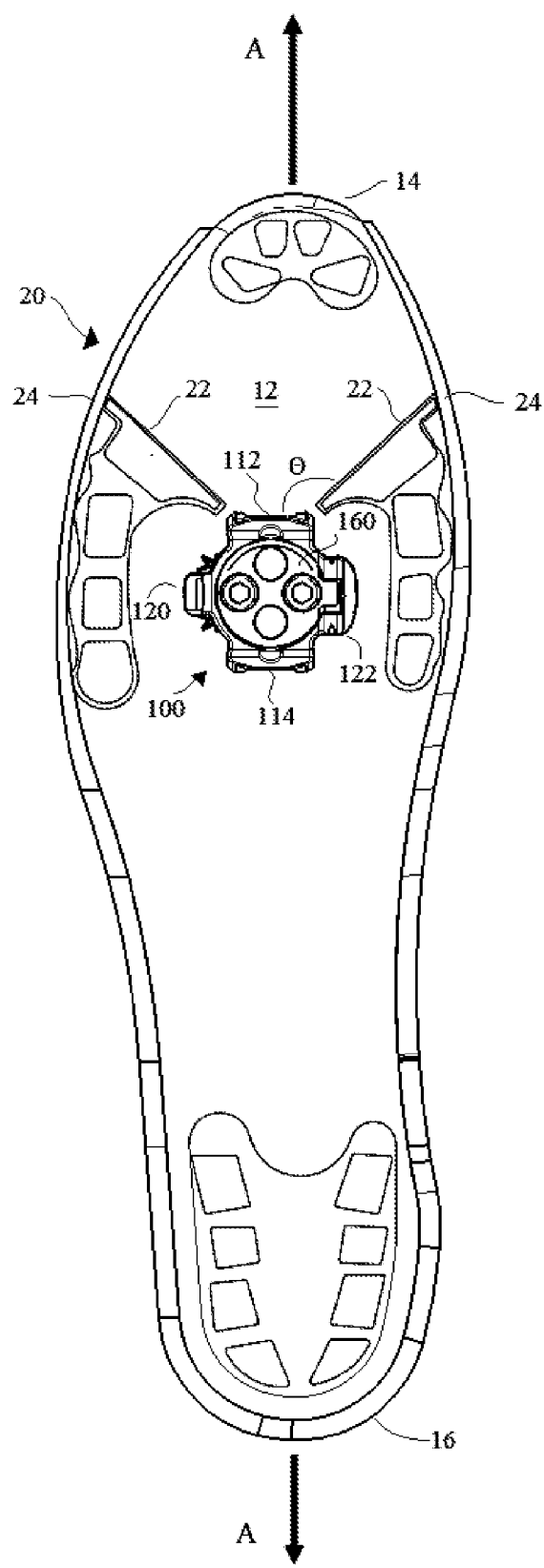
FIG. 10 depicts another embodiment of the cleat assembly mounted to the underside of a shoe sole having guides disposed integrally of the shoe sole.

With reference now to the illustrative drawings, various embodiments of a bicycle pedal and cleat assembly are described and shown. The cleat assemblies described herein are designed to be secured to the underside of the sole of a rider's shoe, as shown in FIGS. 9-10, and are configured to be attachable to a double- or multi-sided pedal assembly. Because the pedal assembly is accessible from either one of the opposing sides (e.g., double-sided or multi-sided), the cleat assembly can be releasably secured to either one of the two sides of the pedal assembly, thereby obviating the need to "right" the pedal before attaching the cleat assembly thereto. In the various embodiments discussed herein, either right or left-sided pedal and/or cleat assemblies are described and illustrated in the drawings, with the understanding that the pedal assemblies are mere mirror images of one another. While the preferred embodiments encompass double-sided pedal assemblies, it is understood that the pedal assemblies described and depicted herein can also be embodied in a pedal assembly having only a single side or multiple sides (e.g., four sided) configured to releasably secure the cleat assembly.

Certain of the basic components and assembly of the cleat and base assemblies described herein are similar to the cleat and pedal assemblies described in co-pending U.S. Ser. No. 12/917,322, filed Nov. 1, 2010, for a Pedal-Cleat Assembly, published as U.S. Pat. Pub. No. 2012/0103131 on May 3, 2010, the entire contents of which are incorporated herein by reference as if fully set forth herein.

FIGS. 1-4 illustrate an embodiment of a cleat assembly 100. The cleat assembly 100 comprises a generally ring-shaped cleat body 110, a base plate 140, a spacer 150, a disc-shaped body 160, and screws 130 coupling the cleat assembly components to the underside of a shoe sole, as depicted in FIG. 9. The base plate 140 is configured to be in facing relation to the underside of the shoe sole and the disc-shaped body 160 is configured to be in facing relation to a base or pedal assembly (see FIGS. 5-8). The cleat assembly 100 further comprises inward and outward lateral projections 120, 122 formed in the cleat assembly's main body 110 that rest atop the pedal assembly 200 on top of the respective inward and outward arches 220, 222 as depicted in FIGS. 5A-5D. This configuration ensures that the entire engagement between the shoe and the base assembly 200 is provided by the cleat assembly 100.

FIGS. 5A-5D illustrate an embodiment of a base assembly 200 that is configured to releasably couple and secure the cleat assembly 100 of FIGS. 1-4. The base assembly 200 is rotatably coupled to an elongated spindle 20 configured to project laterally from a bicycle crank (not shown). The base assembly 200 freely rotates about a spindle axis B-B oriented to be parallel with the crank's rotation axis. As a result of the free rotation of the base assembly 200, the upper and lower surfaces are identical such that the cleat assembly 100 can couple the base assembly 200 without regard to which one of the two surfaces faces the cleat assembly 100 prior to contact and engagement.

Turning now to the portions of the cleat and base assemblies 100, 200 that cooperate with one another, the cleat assembly 100 comprises a forward cleat edge 112 and a rearward cleat edge 114 that is shaped and configured to be releasably secured within the base assembly's forward base edge 212 and rearward base edge 214, respectively. In a preferred embodiment, one or both of the forward and rearward base edges 112, 114 are yieldably spring-biased toward one another.

In a preferred embodiment, both forward and rearward cleat edges 112, 114 define an area or recess which retains the forward and rearward base edges 212, 214, respectively. To that end, the forward and rearward base edges 212, 214 can be shaped as a protrusion or a tongue that is configured to fit closely with the forward and rearward cleat edges 112, 114.

Once the forward and rearward cleat edges 112, 114 are coupled to the forward and rearward base edges 212, 214, respectively, the forward and rearward base edges 212, 214 are in close contact with the lateral contacts 118 on opposing sides of the respective forward and rearward cleat edges 112, 114. While the cleat assembly 100 is depicted as comprising lateral contacts 118 on opposing sides of both forward and rearward cleat edges 112, 114, it is understood that the lateral contacts 118 can be provided on only one of the forward and rearward cleat edges 112, 114.

As shown in FIGS. 9-10, the forward cleat edge 112 is positioned proximate the toe area 14 of the shoe 10 and the rearward cleat edge 114 is positioned proximate the heel area 16 of the shoe 10. Thus the forward and rearward cleat edges 112, 114 are disposed at a distance along a longitudinal axis A-A of the shoe 10.

Guides 116 can be provided to extend laterally outward from the opposing sides of either one or both of the forward and rearward cleat edges 112, 114 to facilitate alignment and engagement with the forward and rearward base edges 212, 214, respectively. In a preferred embodiment, the guides 116 extend laterally outward from the opposing sides of the cleat edge which first engages the base assembly 200. In the preferred embodiments of the cleat assemblies described herein, the forward cleat edge 112 provides the initial engagement with the base assembly 200 and thus the guides 116 are depicted as being provided in connection with the forward cleat edge 112.

The guides 116 each comprise a proximate end that is adjacent, coupled to or integral with the outer side of the forward cleat edge 112 and a distal end 117 away from the cleat body 110. In a preferred embodiment, the guides 116 extend laterally from opposing sides of the forward cleat edge 112 at an angle θ between 95 and 180 degrees, preferably between 120 and 155 degrees, and more preferably between 130 and 145 degrees. One function of the guides 116 is to substantially increase the size of the landing region 12 or "target area" of the shoe such that substantially less precision is necessary in order to align the forward cleat edge 112 with the forward base edge 212 for engagement. Thus, the guides 116 to effectively recruit a larger area of the sole in the engagement process.

FIG. 9 depicts the guides 116 as being a part of, or integral with, the structure of the cleat assembly 100, whereas FIG. 10 depicts guides 22 which are separate from the cleat assembly 200 and instead is integrated with the structure of the sole of the shoe 20. It is understood that the guides 22 and the forward cleat edge 112 can have a gap in between so long as the gap is smaller than the width of the forward base edge 212 such that the gap does not "catch" the forward base edge 212. It is understood that either of the configurations depicted in FIGS. 9 and 10 can be used so long as the proximate ends of the guides terminate at or adjacent to the opposing outer sides of the forward cleat edge 112.

In the embodiment depicted in FIGS. 1-4 and 9, it is understood that the guides 116 are mounted directly onto the sole. In a preferred embodiment, the bottom surface of the guides is mounted substantially flush with the underside of the sole of the shoe, as depicted in FIG. 9. In a particularly preferred embodiment, the bottom surface of the guides is spaced no more than 2 mm from the underside of the shoe sole.

Referring now to both FIGS. 9 and 10, a landing region 12 is generally defined on the underside of the shoe sole forward of the cleat edge 112 and between the guides 116. In a preferred embodiment, the landing region 12 has a generally frusto-conical shape with an enlarged width that opens towards the toe area 14 of the shoe. This landing region 12 provides a significantly greater area of contact between the underside of the shoe 10 with the forward base edge 212 that still permits alignment and engagement of the forward cleat edge 112 and the forward base edge 212. This is better understood with reference to FIGS. 6-8.

FIGS. 6-8 depict the sequence of releasably engaging the cleat assembly 100 to the base assembly 200. It is understood that the shoe, to which the cleat assembly 100 is mounted, is omitted in order to more clearly illustrate the sequence of alignment and engagement of the cleat assembly 100 to the base assembly 200.

Figure 1A:
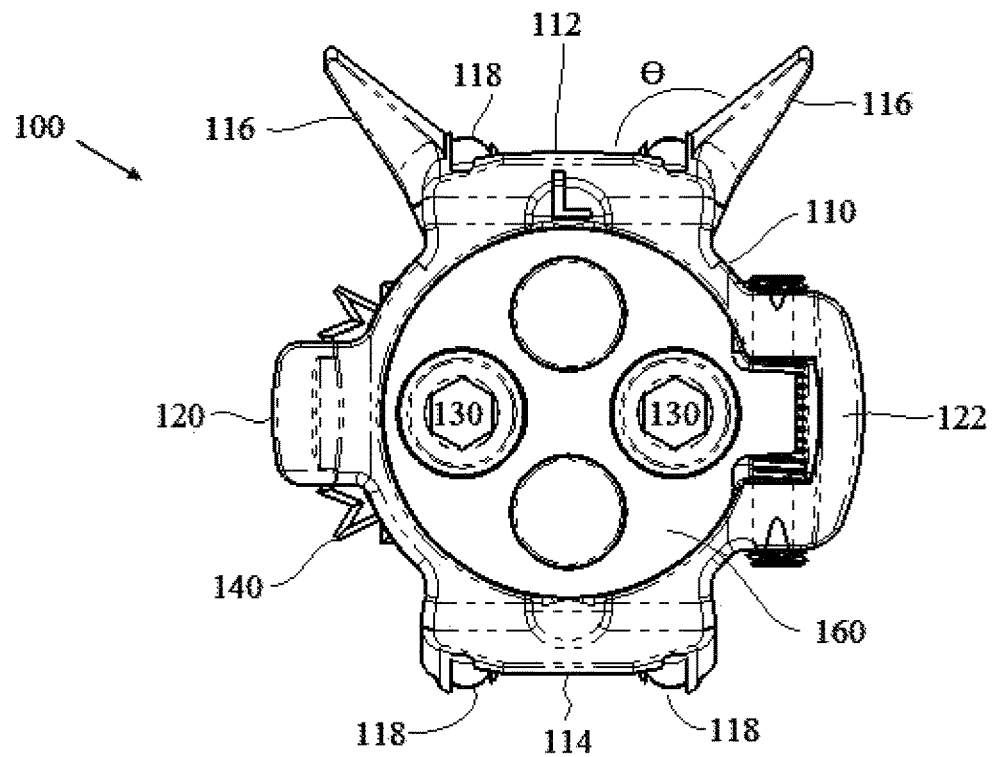
FIGS. 1A-1B are plan and perspective views, respectively, of an embodiment of a cleat, showing the cleat surface configured to be in facing relation with a base assembly.
Figure 1B:
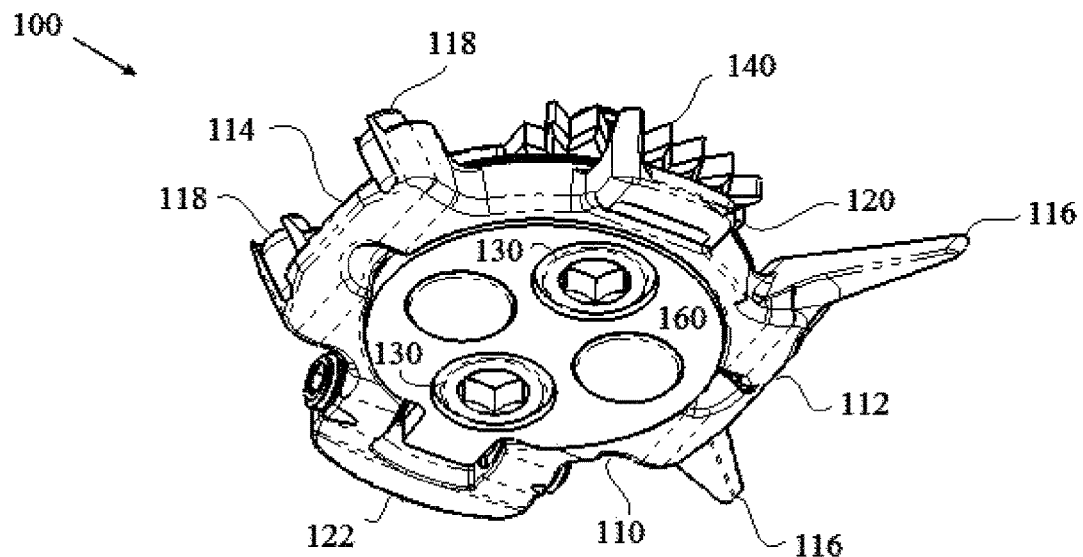
Figure 2A:
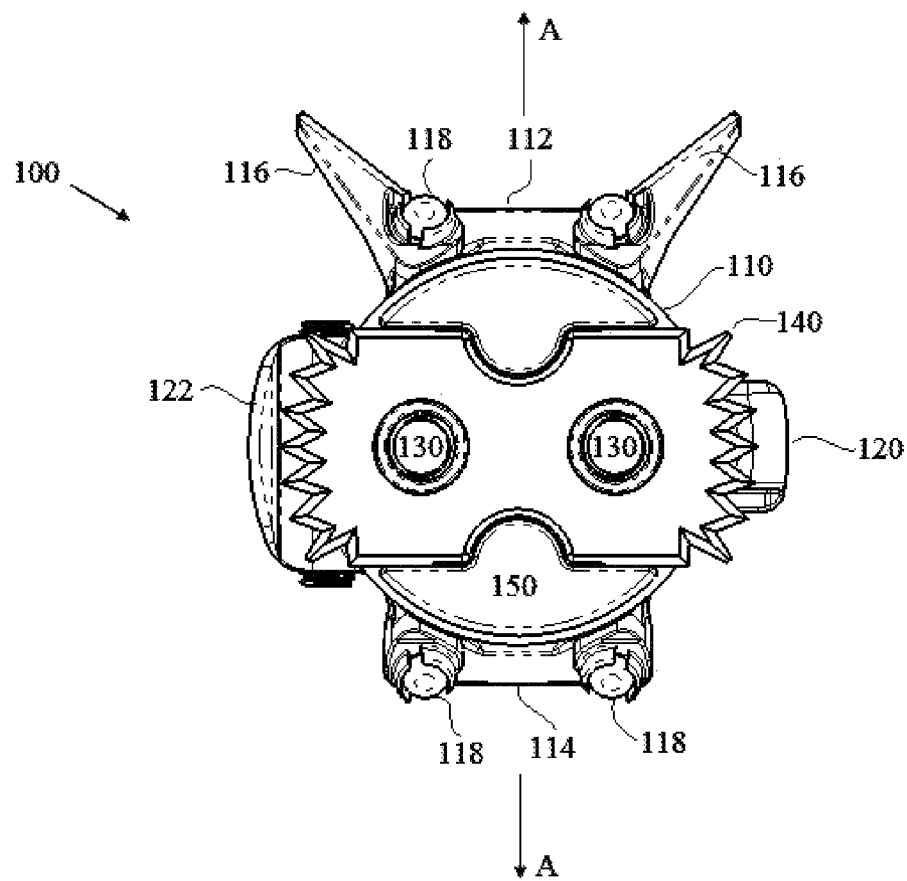
FIGS. 2A-2B are plan and perspective views, respectively, of the cleat of FIGS. 1A and 1B, showing the cleat surface configured to be in facing relation with a shoe.
Figure 2B:
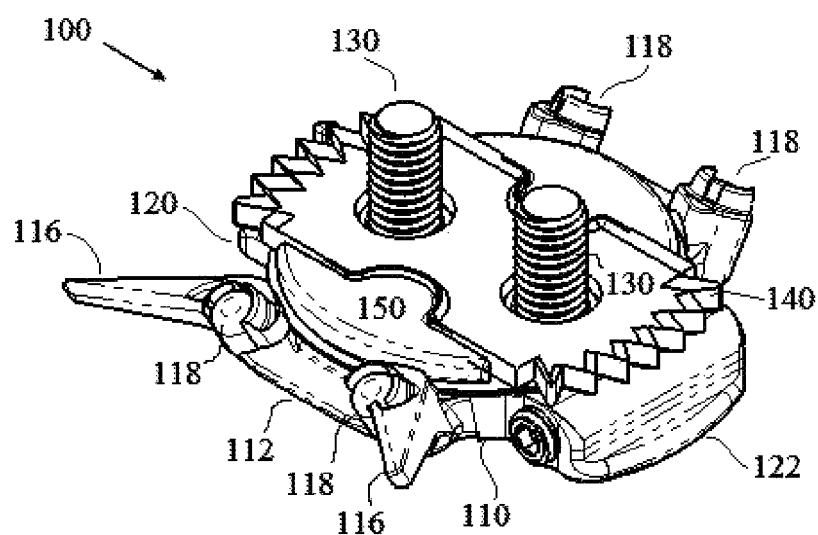
Figure 3A:
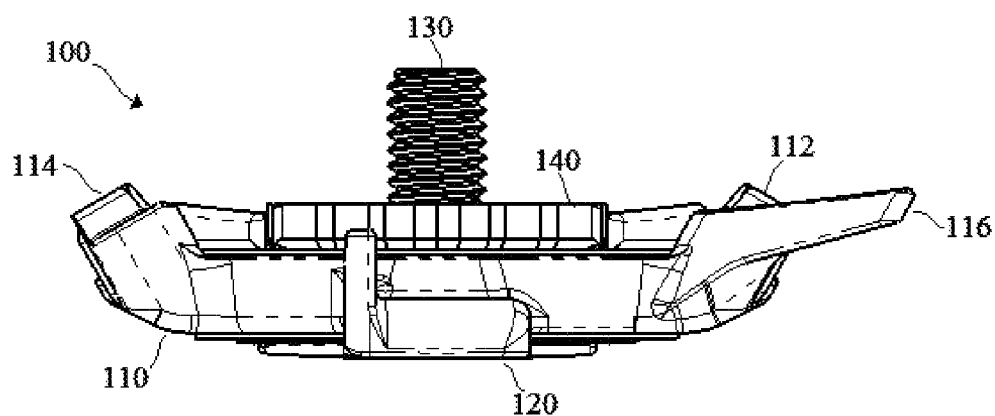
FIGS. 3A-3B are views of the outward and inward sides of the cleat of FIGS. 1A and 1B.
Figure 3B:
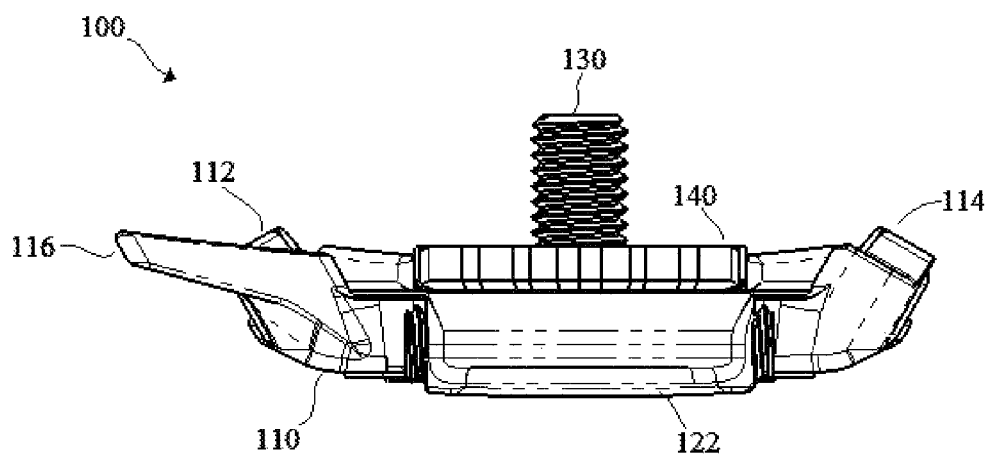
Figure 4A:
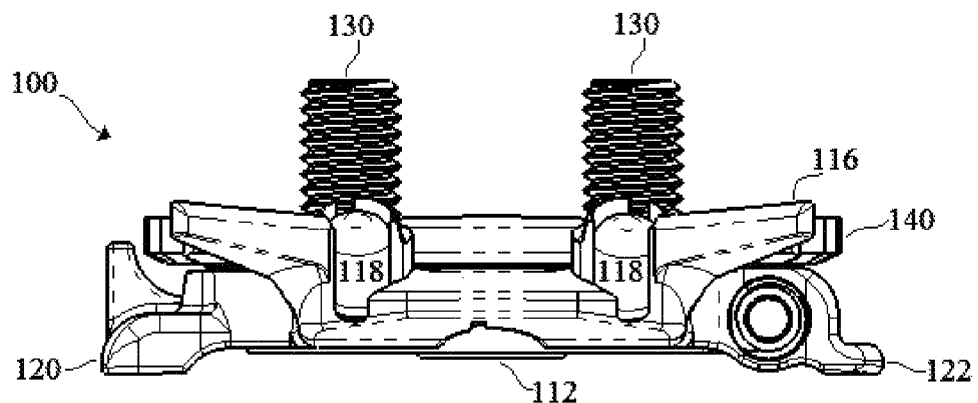
FIGS. 4A-4B are views of the forward and rearward sides of the cleat of FIGS. 1A and 1B.
Figure 4B:
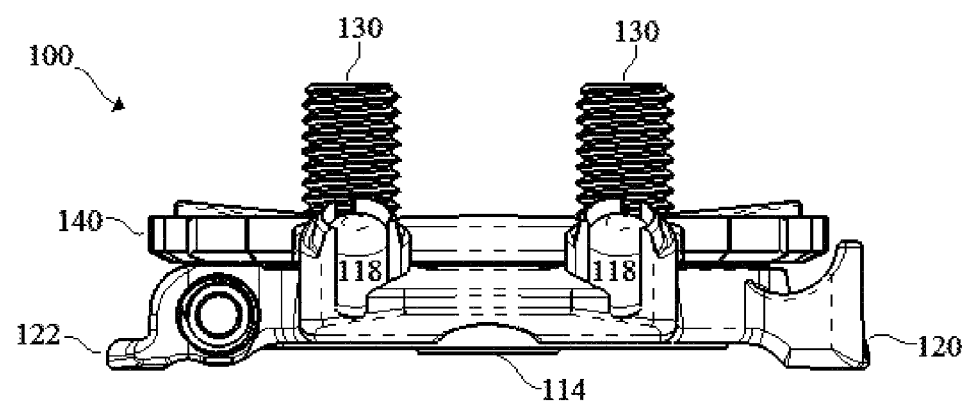
Figure 5A:
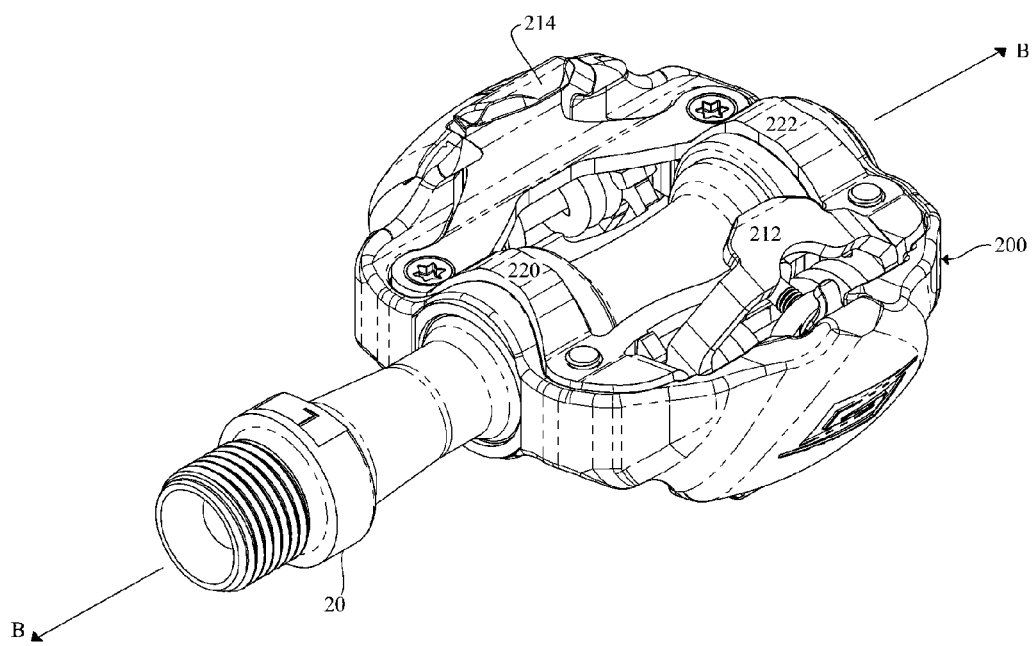
FIGS. 5A-5D are various views of a base assembly configured for releasably engaging the cleat surface depicted in FIGS. 1A and 1B, with FIGS. 5A and 5B being top perspective and plan views, FIG. 5C being a forward side view and FIG. 5D being an inward side view of the pedal assembly.
Figure 5B:
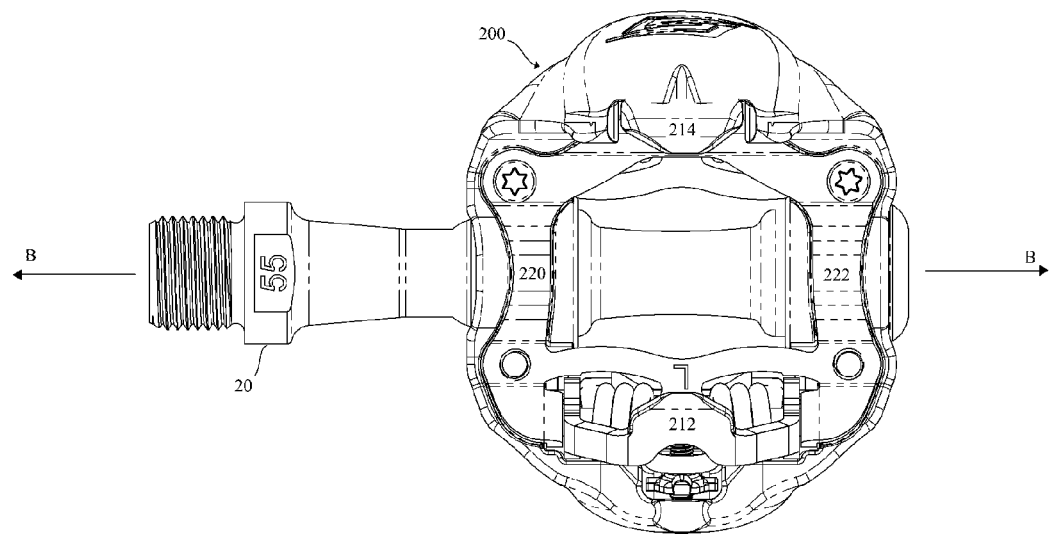
Figure 5C:
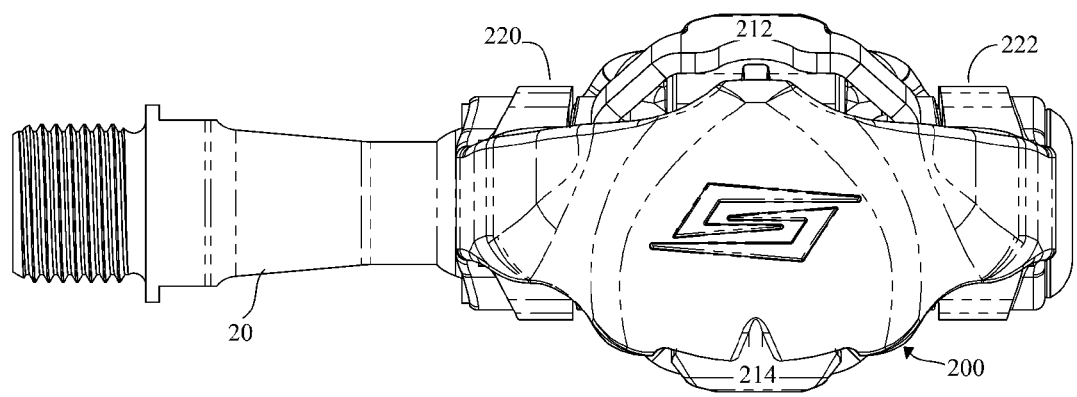
Figure 5D:
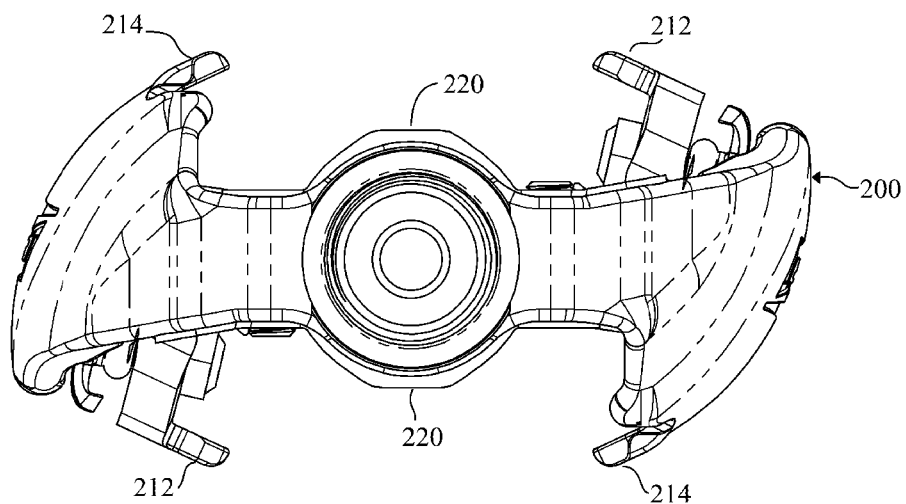
Figure 6A:
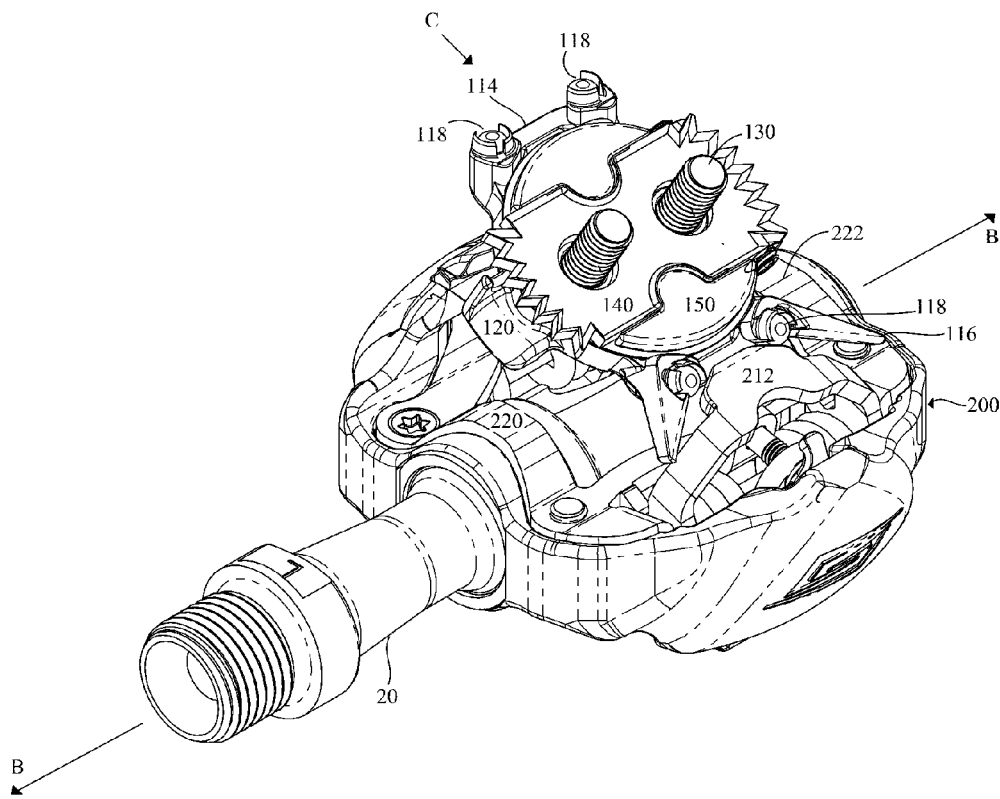
FIGS. 6A-6C depict the forward entry and engagement of the cleat to the base assembly, with FIGS. 6A and 6B being top and forward perspective views, respectively, and FIG. 6C being an outward side view.
Figure 6B:
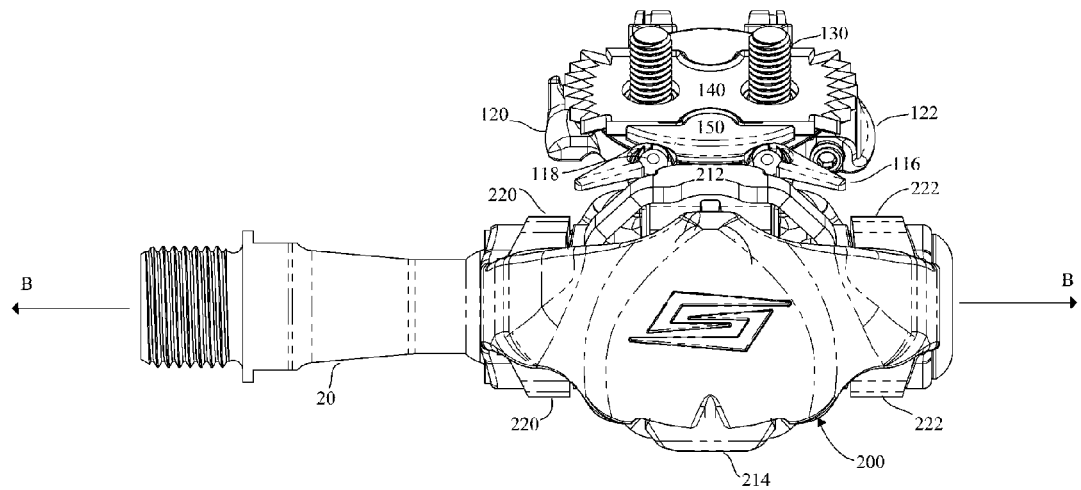
Figure 6C:
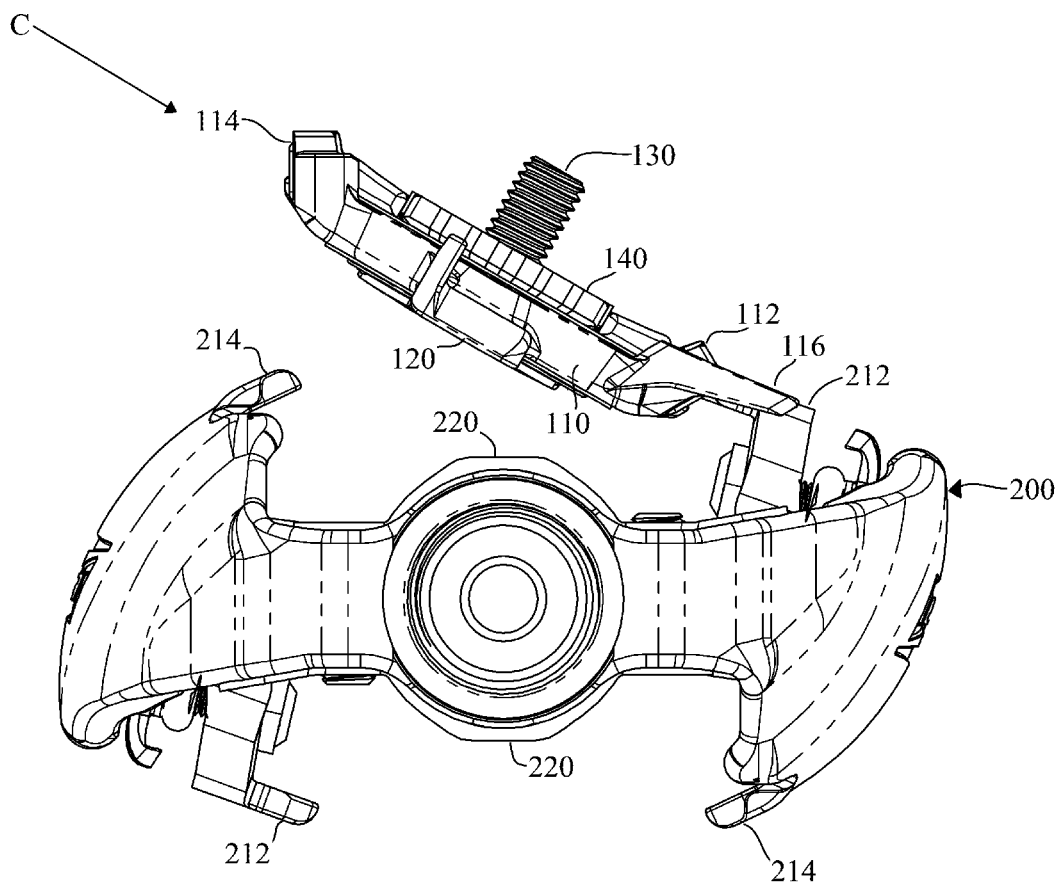

FIGS. 6A-6C depict the engagement of the forward cleat edge 112 with the forward base edge 212 as facilitated by the guides 116. This initial engagement between the cleat and base assemblies 100, 200 is typically the most difficult as the user is required to blindly align the forward cleat edge 112 and the forward base edge 212 and rely solely on tactile feedback. To that end, guides 116 cooperate with the underside of the shoe sole to which it is mounted (see FIG. 9-10) to slidably funnel or direct alignment of the forward cleat edge 112 to the forward base edge 212. Thus, precise alignment between the two is no longer required so long as the forward base edge 212 contacts an area, the landing region 12, of the underside of the shoe sole forward of the forward cleat edge 112 and maintains sliding contact as the shoe is moved forward of the base edge 212 in the direction indicated by the arrow C in FIG. 6A. Once the forward base edge 212 is in sliding contact with a landing region, defined between the cleat edge and the guides 116, continued sliding contact of the forward base edge 212 in a direction forward direction will terminate with alignment and engagement with the forward cleat edge 112.

Figure 7A:
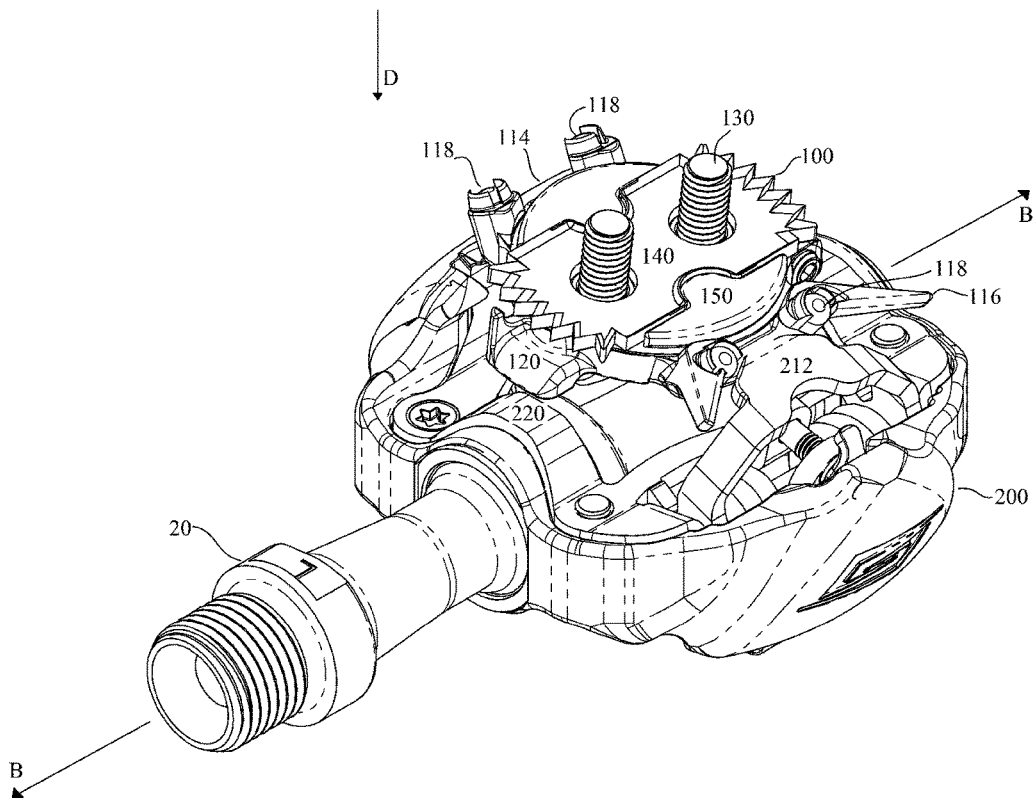
FIGS. 7A-7C depict the downward entry and engagement of the cleat to the base assembly, with FIGS. 7A and 7B being top and forward perspective views, respectively, and FIG. 7C being an inward side view.
Figure 7B:
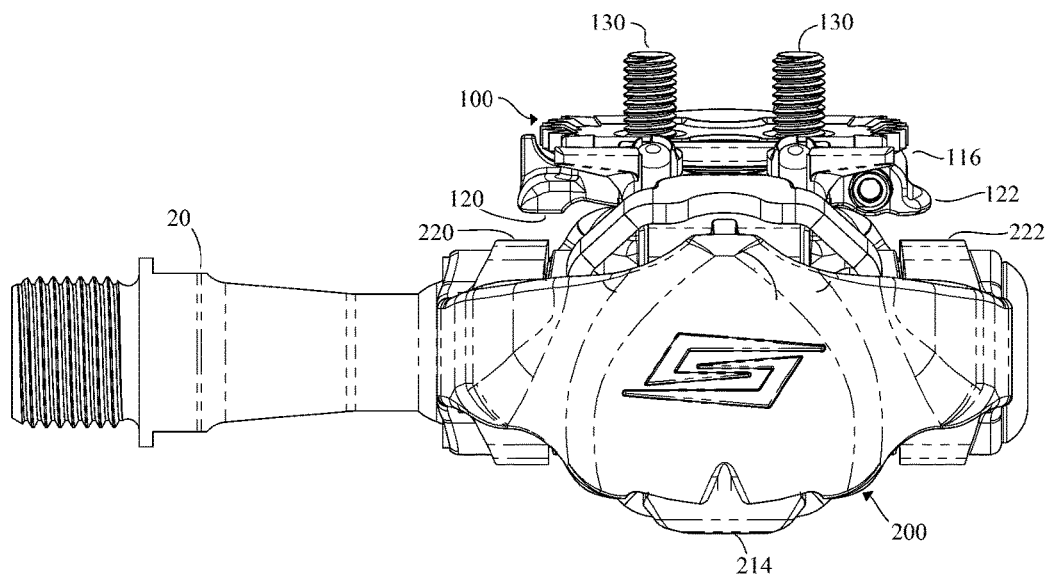
Figure 7C:
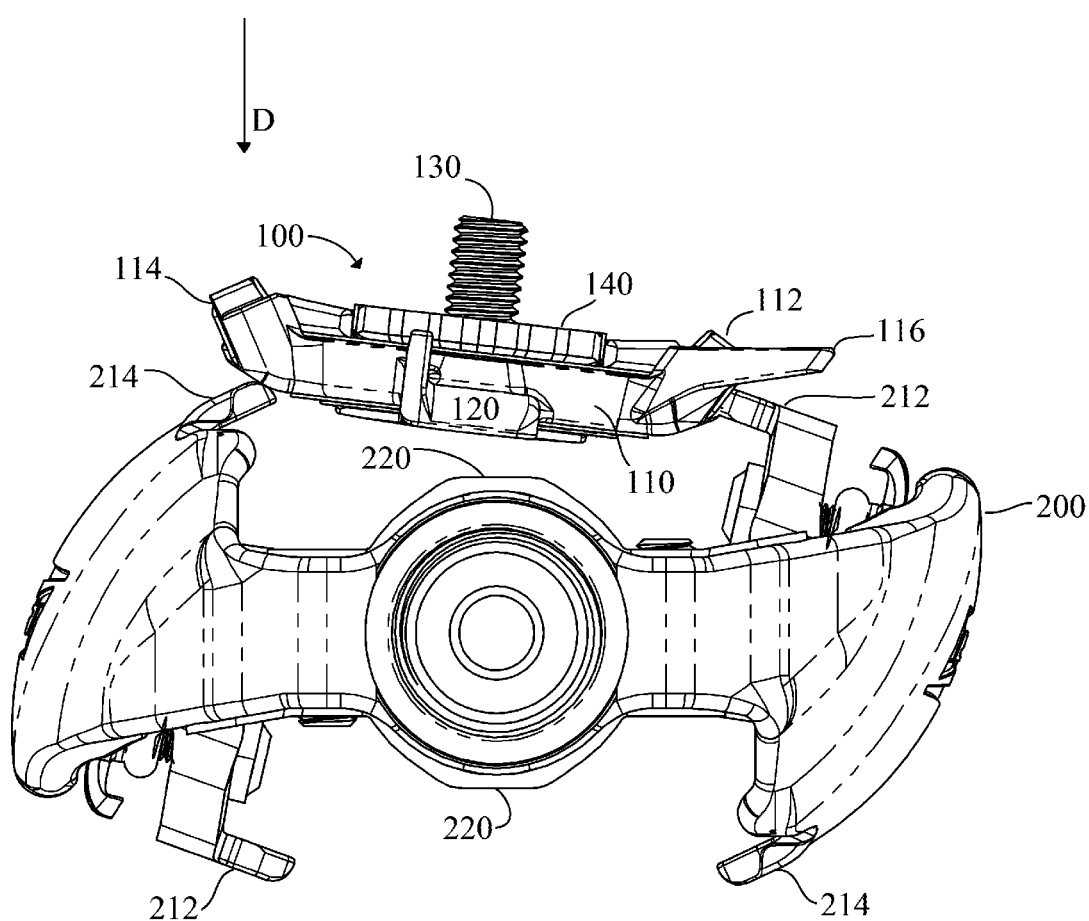

FIGS. 7A-7C depict the alignment of the rearward cleat edge 114 with the rearward base edge 214. The alignment of the rearward cleat edge 114 with the rearward base edge 214 is facilitated by the closely-fitted engagement of the forward cleat edge 112 with the forward base edge 212, which thereby restricts the lateral rotational movement of the rearward cleat edge 114. Engagement of the rearward cleat edge 114 with the rearward base edge 214 results as the rearward cleat edge 114 is urged downwardly onto the rearward base edge 214 in the direction indicated by the arrow D in FIGS. 7A and 7C. The force exerted by the rearward cleat edge 114 on the rearward base edge 214 forcibly moves the forward and rearward base edges 212, 214 apart from each other, against the yielding bias of the spring, to secure and engage the rearward cleat edge 114 underneath the rearward base edge 214.

Figure 8A:
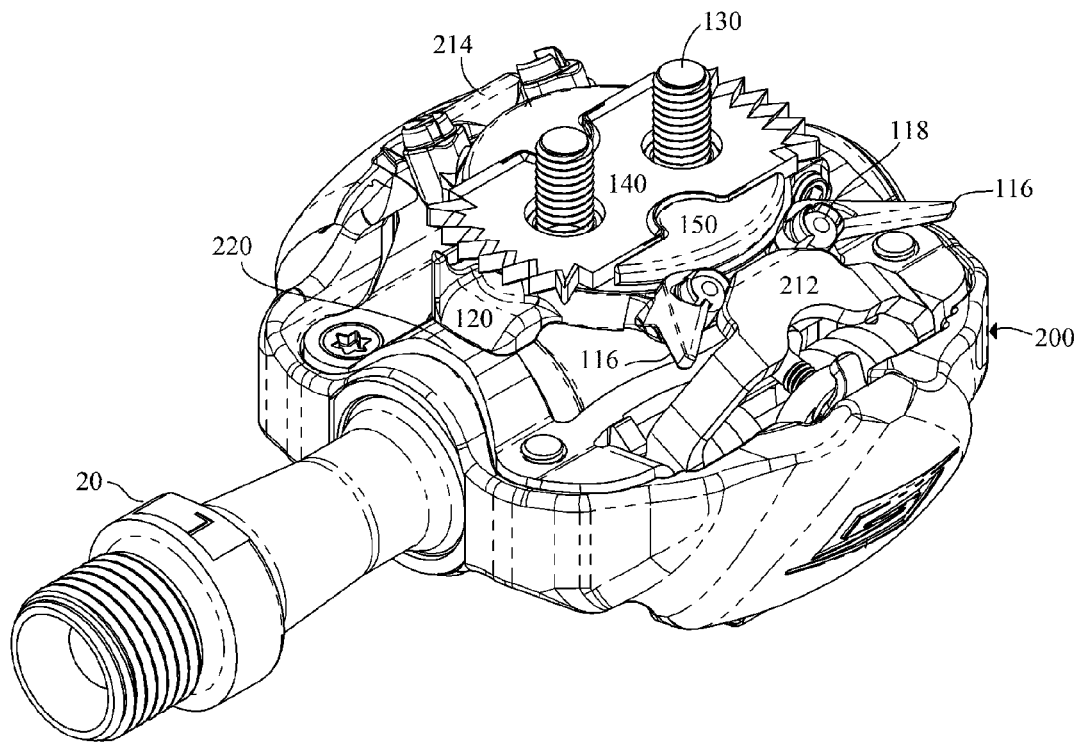
FIGS. 8A-8C depict the engaged cleat and base assemblies, with FIGS. 8A and 8B being top and forward perspective views, respectively, and FIG. 8C being an inward side view.
Figure 8B:
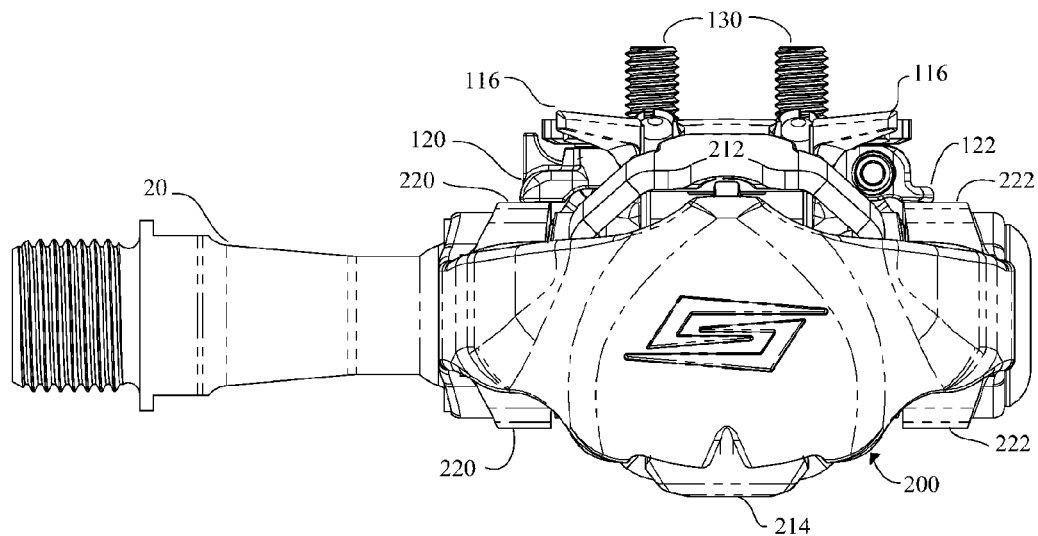
Figure 8C:
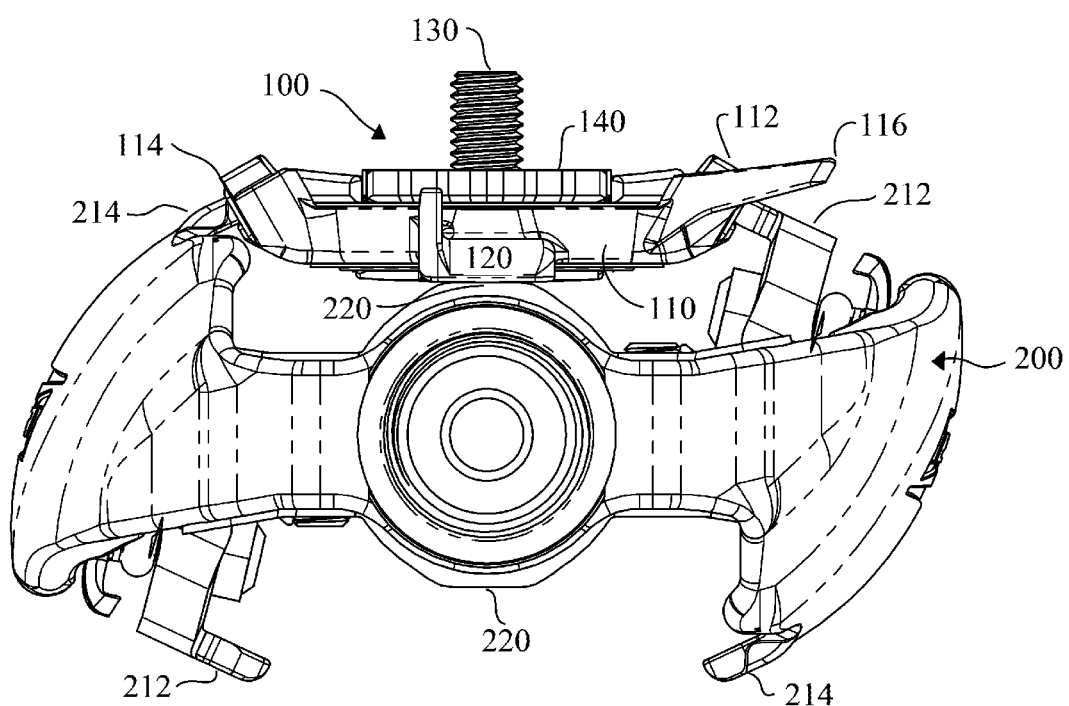

FIG. 8A-8C depict the engaged cleat and base assemblies, in which the forward and rearward base edges 212, 214 is in fitting contact with the forward and rearward cleat edges 112, 114 and the lateral contacts 118 disposed on opposing sides of the forward and rearward cleat edges 112, 114.

Disengagement of the cleat assembly 100 from the base assembly 200 can be achieved by rotating the cleat assembly 100 either clockwise (heel out) or counterclockwise (heel in). In order to facilitate disengagement of the coupled cleat and base assemblies 100, 200, the corners of the forward and rearward base edges 112, 114 can be angled or beveled. The lateral contacts 118 can be provided as a rounded cam surface. Rotation of the cleat assembly 100 causes the beveled portion of the forward or rearward base edges 112, 113 to cam against the lateral contacts 118 and forcibly urge the forward and rearward base edges 212, 214 apart from each other against the yielding bias of the spring mechanism (not shown), thereby releasing the cleat assembly 100 from the pedal assembly 200.

In a preferred embodiment, the lateral contacts 118 is made of a material that has a measure of hardness that is greater than hardened steel. Alternatively or in addition, the forward and rearward base edges 212, 214 are preferably made of a material that is different from the lateral contacts 118 and, most preferably, is made of hardened steel. It is preferable that the two contacting surfaces, e.g., the base edges and the lateral contacts, are not made of the same metallic material so as to avoid the problem of seizing or creating a cold weld or an adhesive surface between the two metals. In addition, the contacting surfaces must be of sufficient strength and durability to resist wear and tear resulting from repeated engagement and disengagement.

Any one of several measures of hardness can be used to determine the relative hardness of a material vis-à-vis hardened steel, such as Mohs, Vickers, Brinell, etc. Any material characterized as having a measure of hardness that is greater than hardened steel, regardless of the method of measurement, can be a suitable material for use in either one or both of a set of contacting surfaces. For example, hardened steel is generally characterized as having a Mohs hardness of about 7.0. Thus, any material having a Mohs hardness greater than 7.0 is suitable for use in either or both of the contacting surfaces.

Non-metals, such as ceramics and, more preferably, carbides represent one class of such suitable materials. Carbides are generally characterized as having a Mohs hardness of 9 or more and include silicon carbide, boron carbide, tungsten carbide and titanium carbide. Carbides are preferable because they are characterized as being extremely hard, non-brittle, resistant to corrosion, and resistant to adhering to other surfaces in the presence of friction Thus, in a preferred embodiment, the lateral contacts 118 are cylindrical inserts made of a material that has a Mohs hardness of greater than 7.0 and is made of a non-metal or a carbide, preferably selected from the group consisting of silicon carbide, boron carbide, tungsten carbide and titanium carbide.

The general principle here is that at least one (if not both) of the two frictional contacting surfaces involved in either the engagement or the release of the cleat and pedal assemblies 100, 200 is made of a material that has a measure of hardness that is greater than hardened steel (e.g., a Mohs hardness of greater than 7.0), preferably a non-metal or a carbide, preferably selected from the group consisting of silicon carbide, boron carbide, tungsten carbide and titanium carbide.

The frictional contacting surfaces involved in the engagement of the cleat and pedal assemblies 100, 200 typically comprise the forward and/or rearward base edges 212, 214 and the lateral contacts 118.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

The following patent publications are incorporated herein by reference in their entireties: U.S. Pat. No. 7,877,904, issued Feb. 1, 2011, U.S. Pat. No. 7,472,498, issued Jan. 6, 2009, U.S. Pat. No. 6,494,117, issued Dec. 17, 2002, U.S. Pub. No. 2012/0103131, published May 3, 2012. The following patent applications are incorporated herein by reference in their entireties: U.S. patent application Ser. No. 13/828,782, filed Mar. 14, 2013, for an Improved Pedal and Cleat Assembly and U.S. patent application Ser. No. 14/028,345, filed Sep. 16, 2013, for a Pedal and Cleat Assembly.

What is claimed is:

1. A bicycle cleat assembly configured to be disposed on an underside of a shoe sole, the bicycle cleat assembly comprising:
   a forward cleat edge and a rearward cleat edge separated at a distance along a longitudinal axis of the bicycle cleat assembly, each of the forward cleat edge and rearward cleat edge having:
   a center portion spanning the longitudinal axis, and opposing left and right ends;
   opposing left and right sides connecting the forward cleat edge and the rearward cleat edge; and
   a pair of guides, each extending from one of the opposing left and right ends of the forward cleat edge to define an expanded landing region for a bicycle pedal;
   wherein each of the pair of guides extends forwardly beyond a forwardmost edge of the center portion of the forward cleat edge;
   wherein each of the pair of guides further extends outwardly from one of the opposing left and right sides of the bicycle cleat assembly; and
   wherein each of the pair of guides extends outwardly at an angle of from 95 degrees to 180 degrees from the forward cleat edge.

2. The bicycle cleat assembly of claim 1, wherein: the forward cleat edge has a substantially straight edge joining the pair of guides.

3. The bicycle cleat assembly of claim 1, wherein the expanded landing region has a frusto-conical shape.

4. The bicycle cleat assembly of claim 1, wherein the pair of guides is coupled to or integral with the bicycle cleat assembly.

5. The bicycle cleat assembly of claim 1, wherein the pair of guides is coupled to or integral with the underside of the shoe sole.

6. The bicycle cleat assembly of claim 1, wherein each of the pair of guides further comprises a pair of opposing edges, each of which projects outward with respect to the longitudinal axis of the bicycle cleat assembly.

7. A cleat and base assembly comprising:
   a cleat comprising:
      a forward cleat edge having:
         a center portion spanning a longitudinal axis of the cleat, and opposing left and right ends;
      a rearward cleat edge having opposing left and right ends, the rearward cleat edge separated at a distance from the forward cleat edge along the longitudinal axis; and
      opposing left and right sides connecting the forward cleat edge and rearward cleat edge; and a pedal base assembly comprising a forward base edge and a rearward base edge, the forward and rearward base edges being configured to releasably retain the forward cleat edge and rearward cleat edge, respectively;

wherein the cleat further comprises a pair of guides, each extending from one of the opposing left and right ends of the forward cleat edge to define an expanded landing region for the pedal base assembly;

wherein each of the pair of guides extends forwardly beyond a forwardmost edge of the center portion of the forward cleat edge;

wherein each of the pair of guides further extends outwardly from one of the opposing left and right sides of the cleat; and wherein each of the pair of guides extends outwardly at an angle of from 95 degrees to 180 degrees from the forward cleat edge.

8. The cleat and base assembly of claim 7, wherein either or both of the forward cleat edge and rearward cleat edge comprises a pair of inserts at the opposing left and right ends, the pair of inserts being configured to contact opposing left and right sides of the pedal base assembly's forward or rearward base edges.

9. The cleat and base assembly of claim 8, wherein each of the pair of inserts is made of a material having a measure of hardness that is greater than hardened steel.

10. The cleat and base assembly of claim 9, wherein the material is a carbide selected from the group consisting of silicon carbide, boron carbide, tungsten carbide, and titanium carbide.

11. The cleat and base assembly of claim 7, wherein the pedal base assembly's forward and rearward base edges are tongue-shaped and curved toward one another, and wherein the pedal base assembly's forward and rearward base edges define retaining spaces for retaining the corresponding forward and rearward cleat edges.

12. The cleat and base assembly of claim 11, wherein the forward and rearward base edges are provided on the base assembly as mirror images of one another.

13. The cleat and base assembly of claim 7, wherein the pair of guides are not engaged with the pedal base assembly when the forward and rearward cleat edges of the cleat are releasably retained by the forward and rearward base edges of the pedal base assembly, respectively.

14. A cleated shoe assembly configured to releasably retain a base edge of a pedal base assembly, the cleated shoe assembly comprising:

a cleat configured to be mounted to an underside of a shoe sole, the cleat comprising:

a forward cleat edge and a rearward cleat edge, the forward cleat edge having a center portion spanning a longitudinal axis of the cleat, and opposing left and right sides extending from respective opposing left and right ends of the forward cleat edge; and a pair of guides, each extending from one of the opposing left and right ends of the forward cleat edge to define an expanded landing region for the pedal base assembly;

wherein each of the pair of guides extends forwardly beyond a forwardmost edge of the center portion of the forward cleat edge;

wherein each of the pair of guides further extends outwardly from one of the opposing left and right sides of the cleat;

wherein each of the pair of guides extends outwardly at an angle of from 95 degrees to 180 degrees from the forward cleat edge; and wherein the pair of guides directs the base edge of the pedal base assembly to the forward cleat edge when the base edge maintains sliding contact with the landing region and the shoe sole moves forwardly with respect to the base edge.

15. The cleated shoe assembly of claim 14, wherein each of the pair of guides has a bottom surface that is spaced apart from the shoe sole at a distance of 2 mm or less.

16. The cleated shoe assembly of claim 14, wherein each of the pair of guides has a bottom surface that is in contact with the shoe sole.

17. The cleated shoe assembly of claim 14, wherein each of the pair of guides extends from one of the opposing left and right ends of the forward cleat edge to a side of the shoe sole.

18. The cleated shoe assembly of claim 14, wherein:
the landing region is an area of the shoe sole forward of the forward cleat edge and between the pair of guides; and
the landing region has a frusto-conical shape.

19. The cleated shoe assembly of claim 18, wherein the landing region is a substantially smooth surface of the underside of the shoe sole to permit sliding contact with the base edge.

20. The cleated shoe assembly of claim 14, wherein the pair of guides are not engaged with the pedal base assembly when the forward cleat edge of the cleat is releasably retained by the base edge of the pedal base assembly.

* * * * *